Aug. 27, 1957 F. C. SCHWANEKE 2,804,289
LIQUEFIER
Filed Nov. 9, 1953
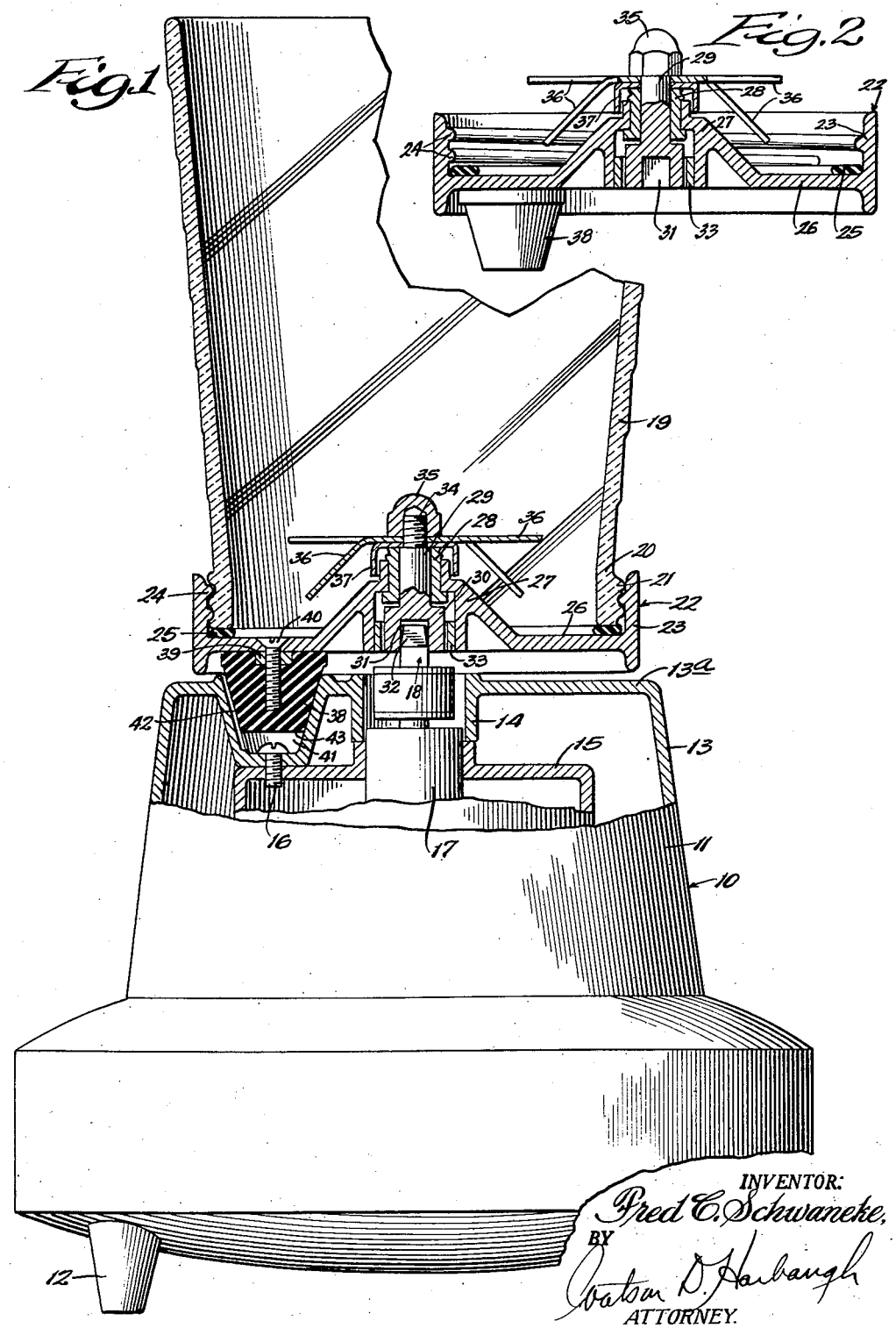
INVENTOR:
Fred C. Schwaneke,
BY
Watson D. Harbaugh
ATTORNEY.

United States Patent Office 2,804,289
Patented Aug. 27, 1957

2,804,289

LIQUEFIER

Fred C. Schwaneke, Chicago, Ill., assignor to Dormeyer Corporation, Chicago, Ill., a corporation of Illinois Application November 9, 1953, Serial No. 390,810

11 Claims. (Cl. 259—108)

This invention relates to a food mixer or liquefier, and more particularly to the mounting and support means for the removable container thereof.

In food mixers such as liquefiers, a container adapted to receive food solids and liquids therein is removably mountable upon a base equipped with a motor, and blades within the container are at such time coupled in operative arrangement with the motor by means of a suitable releasable connection therebetween. The coacting mounting means carried respectively by the container and housing must provide a stable support for the container and at the same time the container must be readily removable and replaceable upon the base. Yet there should be no unnecessary sticking of the container and support means to the base which might cause spillage of the container contents. Further, after removal of the container from the mixer base it is generally placed upon a table or other work surface and the mounting means carried by the container must not be of such character that it would cause scratching or marring, or otherwise disfigure these surfaces.

It is, accordingly, an object of this invention to provide a food mixer or liquefier having novel means for removably mounting the mixer container structure upon the mixer base. Another object of the invention is to provide in a liquefier or the like a bottom closure member for the mixer container that performs the dual function of adequately supporting the container upon the mixer base and when the container is removed from the base the closure member then provides a support for the container that will not mar or scratch a surface upon which it is received. Still another object of the invention is in providing a means for mounting the container of a liquefier upon the liquefier base that is operative to automatically center the container and closure member therefor relative to the base so that proper alignment of the motor shaft within the base and the liquefier blades positioned within the container, and an operative connection therebetween, is assured.

Yet another object is to provide a mounting means for a liquefier container upon the liquefier base that is capable of attenuating reactive forces that may be created when the blades of the liquefier, which whirl at a rapid rate of speed, meet objects such as ice that create sharp impact forces upon the blades. A further object is in providing a mounting arrangement for removably securing the liquefier container upon the liquefier base that furnishes a relative large gripping force resulting in a stable mounting but yet provides little resistance to the removal of the container from the base when this is required. Still a further object is to provide in a liquefier a closure member that removable receives a container therein and that is equipped with elastic feet receivable within complementary sockets provided by the mixer base; the sockets being equipped with means to prevent the formation of a vacuum therein below the feet during the removal of the closure member from the base. Additional objects and advantages will appear as the specification proceeds.

An embodiment of the invention is illustrated in the accompanying drawings, in which—

Figure 1 is a vertical sectional view taken through substantially the center of the structure and in which the base is shown partly in elevation; and Fig. 2 is a vertical sectional view of the closure member that receives the container and that is releasably mountable upon the base.

The apparatus illustrated in Fig. 1 is designated generally with the numeral 10 and is customarily referred to as a liquefier. It is operative to cut up foodstuffs such as fruits, etc., and to form fine particles that may be readily suspended within a liquid. The apparatus may also be used for chopping ice, for making mixed drinks and beverages—for example, from ice cream—etc.

The mixer or liquefier 10 is provided with a base or housing 11 that may be generally cylindrical or, if desired, may assume any other shape. The base 10 is equipped with a plurality of feet or legs 12 that may be secured thereto by any suitable means and serve as a mounting or support for the base and mixer. The base 11 has upwardly-extending side walls 13 that are formed integrally with a top wall 13a that is substantially horizontal and terminates centrally in a depending collar 14. A bracket 15—that may be carried by the housing or base in any suitable manner and, for example may be secured thereto by cap screws 16—provides a mounting for a motor 17 that is only partly shown and which has a shaft 18 extending upwardly therefrom and to an elevation above the upper surface of the top wall 13a. The motor 17 and mounting therefor may be wholly conventional and since such structure is well known in the art a further description thereof is believed unnecessary and will not be set out.

The liquefier 10 is also equipped with a container 19 that is preferably cylindrical and is provided with side walls that taper upwardly and outwardly. The container 19 is open at both ends and at its lower end 20 it is equipped with external threads 21. The container 19 may be formed from any suitable material and, for example, may be glass or plastic. Preferably the container 19 is transparent so that the contents thereof are readily visible to the user of the liquefier.

The bottom end of the container 19 is preferably closed by a closure member 22 having annular side walls 23 equipped with internal threads 24 that threadedly receive the container 19 therein. To insure a liquid-tight seal between the closure member 22 and container 19, a resilient gasket 25 may be interposed between the bottom wall 26 of the closure member and the lower peripheral edge of the container.

The bottom wall 26 of the closure member 22 tapers upwardly and inwardly at the center thereof and forms a collar portion 27 that rotatably receives therein a bearing 28. The bearing 28 is rigidly secured to a coupling providing a shaft portion 29 and a lower enlarged portion 30 that has a square recess 31 therein that is adapted to receive the upper tapered end 32 of the motor shaft 18. If desired, a seal 33 may be interposed between the walls of the collar portion 27 and the lower enlarged portion 30 of the coupling. At its upper end the shaft portion 29 is threaded, as is indicated at 34, and a nut 35 rigidly and tightly secures a plurality of blades or cutters 36 upon the shaft 29 and bearing 28. A guard 37 may be interposed between the cutters 36 and the bearing 28 and is preferably provided with depending side walls that serve as a shield and tend to prevent the accumulation of food particles, etc., around the bearing 28. The blade structure described is well known in the art and although the parts thereof have been enumerated it is believed that a further description is unnecessary. It is believed sufficient to say that the cutter blades 36 are supported for rotation by the closure member 22 and are adapted to be brought into operative arrangement with the motor 17 so as to be rotated thereby. Further, a sealing means is preferably provided so that the contents of the container 19 do not flow downwardly through the collar or hub portion 27 and into the motor structure within the base 11.

The closure member 22 is equipped with a plurality of depending feet or support members 38 that are each equipped with a nut 39 that threadedly receives a cap screw 40 that extends through a suitable aperture within the wall 26 of the closure member. It will be apparent that each of the feet 38 should be provided with a passage therein that will receive the lower end of the cap screw 40. Preferably, each of the openings within the wall 26 is countersunk so that the head of the cap screw will be received therein and can be covered over or sealed if this is desired to provide a smooth and finished surface upon the wall 26. Any suitable means may be employed to secure the nuts 39 within the feet 38 and, for example, the nuts may be resiliently held within the feet if the feet or support members are formed of an elastic material.

It is preferred that the feet 38 be resilient and therefore a suitable elastic material may be used for forming the feet. For example, an elastomer such as natural or synthetic rubber may be used with success. Any number of feet 38 may be provided and at least three feet at equally spaced distances about the bottom wall 26 should be furnished.

Each of the support members or feet 38 is adapted to be received within a socket 41 that is provided in the top wall 13a of the base 11. A socket 41 will be formed for each of the feet and the sockets will be alignable with the feet and adapted to receive the same therein. Preferably, both the feet 38 and the sockets 41 are frusto-conical in shape and are complementary so that the side walls of the feet taper inwardly and downwardly while the side walls of the socket members taper upwardly and outwardly. Thus, the walls of the sockets 41 support the feet 38 with the bottom wall 43 of the feet held in spaced relation to the bottom of the socket. Means should be provided for preventing the formation of a vacuum within the sockets 41 upon the removal of the feet 38 therefrom, and I prevent this occurrence by including elongated passages 42 that extend from substantially the bottom of the sockets to the top thereof. One passage 42 for each socket will be sufficient.

*Operation*

In operation of the liquefier 10, the container 19 is filled with the material to be broken up by the blades 36 after the container has first been securely screwed into position within the closure member 22, as is illustrated in Fig. 1. The filling of the container 19 may take place either before or after the container and closure member are in position upon the base 11. In the arrangement shown in Fig. 1 wherein the container 19 and closure member 22 therefor are mounted upon the base 11, the motor shaft 18 is in engagement with the walls of the recess 31 provided in the coupling member. Therefore when the motor 17 is energized upon the completion of the electric circuit therefor (which is not shown and may include conventional switch means, etc.) the motor will rotate, rotating the coupling member and blades 36 and the contents of the container 19 will be broken up and liquefied.

After the contents of the container 19 are suitably mixed the motor 17 is deactuated and the container and closure member 22 are simply lifted upwardly from the base 11 and may be deposited upon an appropriate support surface. The contents of the container 19 may be poured therefrom, and for cleaning, the container 19 is simply turned relative to the closure member 22 to unscrew the members, which will provide access to the blades 36 and their associated mechanism so that cleaning of these parts will be facilitated.

When the container 19 and closure member 22 therefor are removed from the base 11, these members may be positioned upon any support surface without the danger of marring or scratching the same, for the flat bottom wall 43 of each of the feet 38 engages the surface and the resiliency of the feet prevents damage to the surface. Thus the problem that has long existed in this field, of providing suitable containers and closures therefor that will not scratch or mar surfaces that receive the same, is herein overcome. At the same time, the feet 38 perform the important function of stably supporting the container and closure member therefor upon the base 11 with the blades 36 in operative arrangement with the motor 17. The feet provide a stable support and hold the container and closure member very tightly to the base 11 because of the large contacting surfaces between the feet and the socket members. The frictional engagement of these large surfaces provides considerable holding force that secures the container and closure member to the base in a sturdy assembly. However, it is nevertheless easy to remove the container and closure member, since the slightest upward force thereon will be effective to withdrawn the feet 38 from the sockets 41 by the small distance required to completely separate the inclined walls of the sockets and inclined walls of the feet. The passages 42 vent the lower ends of the sockets to atmosphere and there is no pressure vacuum created below the feet that would tend to resist upward movement thereof.

The yieldability or elasticity of the feet 38 while effective to attenuate or dampen any reactive force that may be caused by the impact of the whirling blades 36 against hard food particles or ice, etc., this same property of the feet 38 also is operative to dampen primary and secondary vibrations and wear of the moving parts is, then, minimized.

While in the foregoing specification an embodiment of the invention has been set out in considerable detail for purposes of illustration, it will be apparent to those skilled in the art that considerable deviation from these details may be made without departing from the spirit of the invention.

I claim:

1. In apparatus of the character described, a base equipped with a motor, a container, a closure member for said container in sealing engagement therewith and equipped with rotatable blades operatively arranged with said motor, means for removably supporting said closure member upon said base, said means including a plurality of spaced apart elastic feet depending from said closure member and complementary sockets provided by said base and receiving said elastic feet therein, said feet having inclined side walls and said sockets having complementary inclined side walls adapted to support said feet, each of said sockets being provided with a longitudinally-extending slot in a side wall thereof to forestall the formation of a vacuum therein upon the removal of said feet therefrom.

2. In mixer apparatus of the character described, a base equipped with a motor, a container, a closure member for said container and equipped with rotatable blades adapted to be operatively arranged with said motor when said closure member is supported upon said base, and means for removably supporting said closure member upon said base comprising a plurality of spaced-apart, elastic cone-shaped feet carried by said closure member and depending therefrom and a plurality of spaced-apart, complementary cone-shaped sockets provided by said base, the walls of said sockets being adapted to releasably support said feet therein.

3. Structure according to claim 2 in which said sockets are provided with longitudinally-extending passages in the walls thereof to prevent the creation of a vacuum therein upon removal of said feet therefrom.

4. In a liquefier having a motor-equipped base and a container provided with a closure member therefor equipped with rotatable blades, said closure member being removably mountable upon said base to establish an operative connection between the motor and blades, means for removably supporting said closure member upon said base comprising a plurality of resilient feet carried by said closure member and depending therefrom, said feet having inwardly and downwardly tapering side walls, and a plurality of sockets alignable with said feet and having upwardly and outwardly tapering side walls provided by said base, the walls of said sockets being adapted to releasably engage the walls of said feet therein for supporting said closure member with the blades thereof in operative arrangement with said motor.

5. The liquefier of claim 4 in which said feet and sockets are frusto-conical, and each of said sockets is provided with means providing atmospheric pressure therein at all times.

6. The structure of claim 5 in which said container is provided with a removable closure member.

7. In a liquefier, a base member equipped with a top wall and having a motor with the shaft thereof extending upwardly through the top wall, a container, a closure member for said container and adapted to be removably secured thereto and a plurality of spaced-apart feet rigidly secured to said closure member and depending therefrom, said feet being frusto-conical and being formed of an elastic material, said top wall of the base being provided with a plurality of spaced-apart frusto-conical sockets alignable with said feet and being complementary thereto and adapted to removably receive said feet therein with the bottom walls of said feet held in spaced relation to the bottom walls of said sockets, said closure member being equipped with a plurality of blades rotatably mounted therein and having socket means adapted to be brought into operative arrangement with the shaft of said motor when said closure member is supported upon said base with the feet thereof within said sockets, each of said sockets being provided with means for preventing the formation of a vacuum therein upon the removal of said feet therefrom.

8. In a mixer of the character described having a closure-equipped container adapted to be removably supported upon a base, a base member having side walls and an integral top wall formed therewith, said base member being adapted to be supported upon a generally flat surface and being equipped with motor means having a shaft extending upwardly through said top wall, said top wall having a plurality of depending sockets therein oriented in spaced-apart relation and being adapted to removably receive feet carried by said closure, said sockets having upwardly and outwardly inclined side walls adapted to support said feet and having at least one elongated passage therein extending from substantially the bottom of the socket to the top thereof.

9. In a mixer of the character described having a base equipped with a motor and adapted to removably support a container structure thereon, a plurality of sockets defined in said base having upwardly and outwardly inclined side walls having a container, open at its bottom and being equipped with external threads adjacent thereto, a closure member adapted to threadedly receive said container and be brought into sealing relation therewith, said closure member being equipped with blades adapted to be brought into operative arrangement with said motor when said closure member is supported upon said base, said closure member being provided with a plurality of depending feet formed from a resilient material and adapted to be received within said sockets provided by said base with the side walls of said sockets supporting said feet, each of said feet having a substantially flat bottom wall adapted to be received upon a generally horizontal surface to provide a support for said container and closure.

10. In a liquefier having a motor-equipped base and a container, means for removably supporting said container upon said base and for providing a bottom closure therefor comprising a plurality of sockets defined in said base having upwardly and outwardly inclined walls a closure member equipped with an upwardly-extending annular side wall having internal threads and being adapted to threadedly receive said container therein, said closure member being equipped with a plurality of mixer blades rotatably mounted therein and being adapted to be brought into operative arrangement with a motor carried by said base, and a plurality of resilient feet, oriented in spaced-apart relation about said closure member and depending therefrom, said feet having substantially flat bottom walls adapted to provide a support for said closure member and a container received therein when both are removed from said base and side walls complementary to the side walls of said sockets, said side walls being adapted to engage the side walls of said sockets in supported relationship selectively.

11. In an apparatus of the character described, a base equipped with a motor, a container, a closure member for said container in sealing engagement therewith and equipped with rotatable blades operatively arranged with said motor, and means for removably supporting said closure member upon said base, said means including a plurality of spaced apart elastic feet depending from each said closure member and complementary sockets provided by said base and receiving said elastic feet therein, said feet having inclined side walls and said sockets having complementary inclined side walls engaging the side walls of the feet in supporting relationship.

References Cited in the file of this patent

UNITED STATES PATENTS

| | | |
|---|---|---|
| 1,445,617 | Jehu | Feb. 13, 1923 |
| 1,540,740 | Weiss | June 2, 1925 |
| 2,171,441 | Barry | Aug. 29, 1939 |
| 2,304,476 | Poplawski | Dec. 8, 1942 |
| 2,309,347 | Landgraf | Jan. 26, 1943 |
| 2,530,455 | Forss | Nov. 21, 1950 |
| 2,546,949 | Morrison | Mar. 27, 1951 |
| 2,585,255 | Kochner et al. | Feb. 12, 1952 |